April 2, 1963 H. J. BRETTRAGER ET AL 3,083,652
EARTH CONDITIONING AND SEEDING TRAILER
Filed April 25, 1960 3 Sheets-Sheet 3

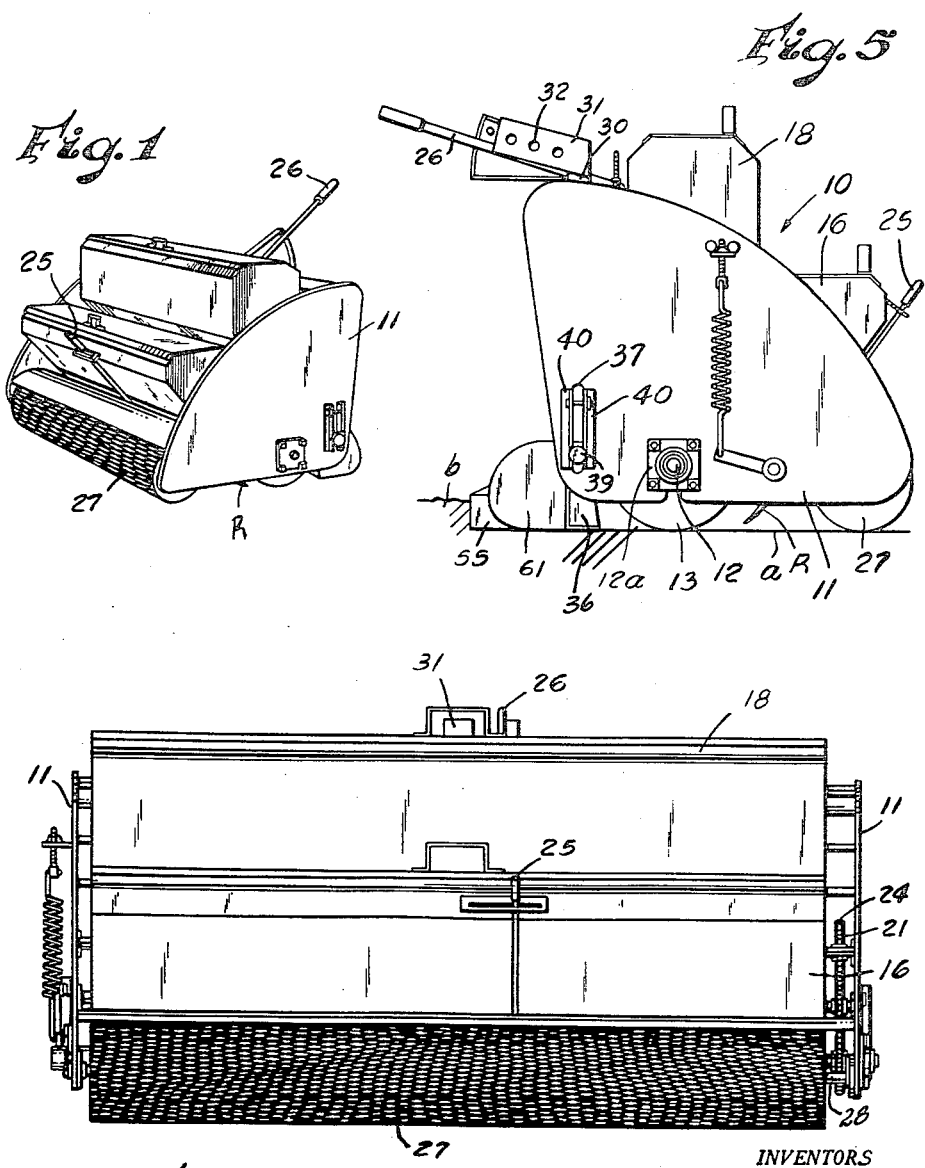

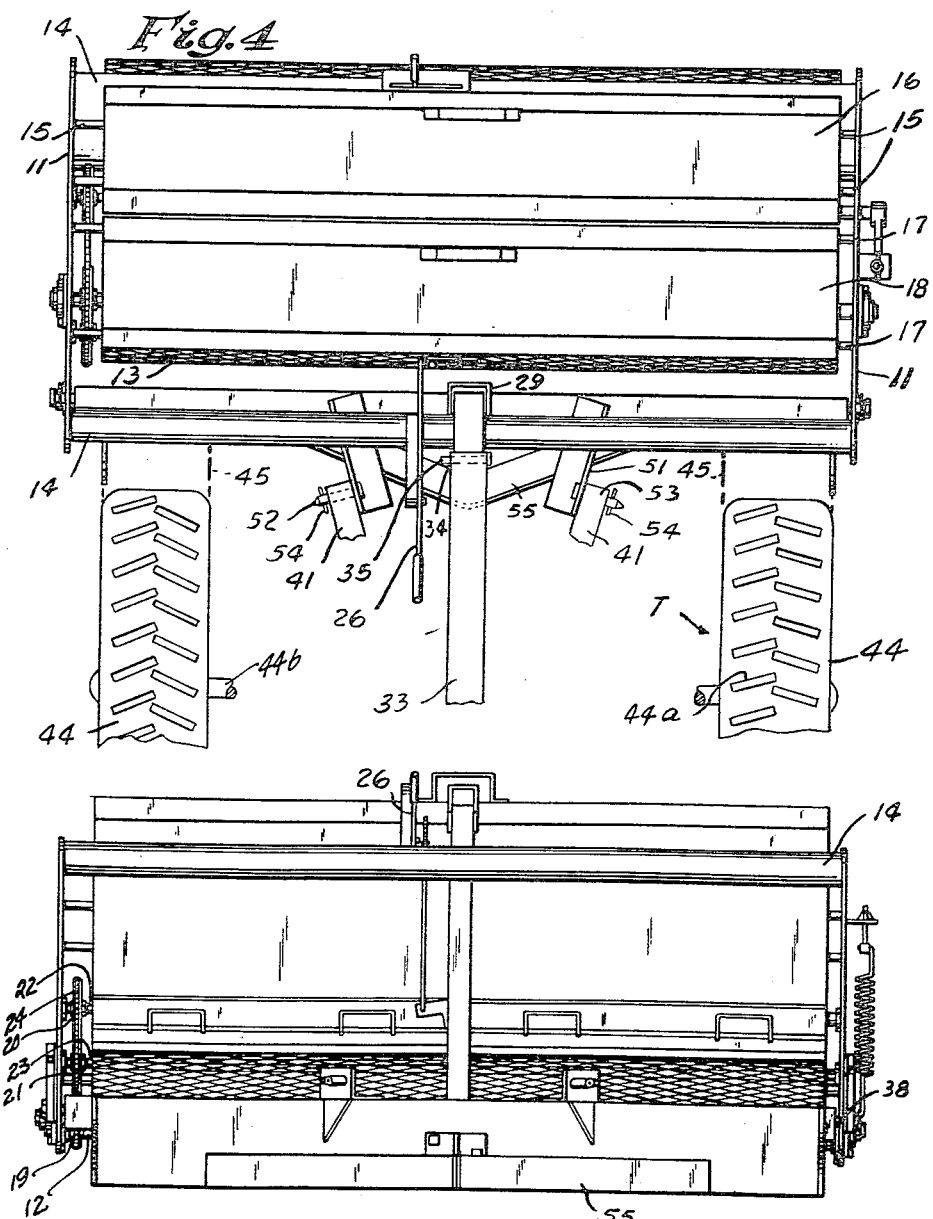

INVENTORS
HENRY J. BRETTRAGER
JOSEPH F. McDONALD
BY
ATTORNEYS

United States Patent Office 3,083,652
Patented Apr. 2, 1963

3,083,652
EARTH CONDITIONING AND SEEDING TRAILER
Henry J. Brettrager and Joseph F. McDonald, Saginaw, Mich., assignors to Brettrager Manufacturing Company, Saginaw, Mich., a corporation of Michigan
Filed Apr. 25, 1960, Ser. No. 24,394
4 Claims. (Cl. 111—8)

This invention relates to earth conditioning and seeding trailers and particularly to an improved machine of the general type disclosed in Patent No. 2,730,054, which is suited to the preparation and seeding of larger lawn areas than the self-propelled machine of the patent. The instant machine is of a type having a wide span which can process a comparatively wide strip during a pass across the area to be seeded and is drawn by a tractor.

It is a principal object of the present invention to provide an earth conditioning and seeding trailer of the type described to granulate the large lumps of soil, fertilize the ground, drop the seed, rake earth over the seed, and thence roll the seeded area in a manner to leave a crosshatched finish to prevent erosion, which includes mechanism for insuring that the ground conditioning vehicle operates on a relatively smooth and level surface.

The invention is concerned with the provision of a backer blade or float on the earth conditioning and seeding trailer which is adjustable to a set height so that it pulls along surplus soil, and which incorporates members displacing soil in a manner to fill the tire marks left by the tractor. In this way a uniformly level seed bed is provided for the machine to operate upon.

It is a further object of the invention to provide apparatus of the character described which can be raised while the tractor is in motion and the trailer in operation.

It is a further object of the invention to design an improved earth conditioning and seeding trailer which can be very simply and economically manufactured and assembled and which is highly efficient and reliable in operation.

Other objects and advantages of the invention will be pointed out specifically or will become apparent from the following description when it is considered in conjunction with the appended claims and the accompanying drawings, in which:

FIGURE 1 is a perspective rear elevational view of the machine;

FIGURE 2 is an enlarged rear elevational view thereof;

FIGURE 3 is an enlarged front elevational view thereof;

FIGURE 4 is an enlarged top plan view thereof;

FIGURE 5 is an enlarged side elevational view thereof;

Figure 6:
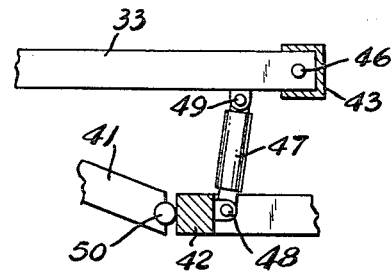
FIGURE 6 is a fragmentary, sectional, side elevational view illustrating the manner in which the backer blade and earth deflecting assembly can be raised or lowered from the tractor.

Referring now more particularly to the accompanying drawings, in which a trailer of the character described is shown, a numeral 10 is employed to generally indicate the trailer vehicle, which mechanically includes the same elements shown in Patent No. 2,730,054 except for the backer blade and earth deflecting assembly which has been mentioned. For a mechanical understanding of the various operative parts of the rolling, fertilizing, seeding and raking elements, attention is invited to Patent No. 2,730,054, which is incorporated by reference for whatever further disclosure of these parts is desirable. The conditioning and seeding trailer 10 will not be described in great detail in this specification since, while it differs considerably in appearance from the machine of the patent, it has the same components, with the exception of the blade and earth distributing assembly mentioned, and functions to fertilize and seed the area in the same way.

Briefly, the trailer 10 includes a pair of side plates 11 which journal a shaft 12 in bearings 12a, the shaft 12 mounting an expanded metal mesh roller 13 which is, of course, revolved as the trailer 10 is drawn over the ground by a tractor, generally designated T (see FIGURE 4), which will be later described. The side plates 11, which are connected by cross members 14, carry braces 15 which support a seed hopper 16, and braces 17 which support a fertilizer hopper 18. The seed hopper 16 and fertilizer hopper 18 are of the type shown in the aforementioned patent, wherein hopper rotors driven from the shaft 12 are revolved as the trailer is being drawn over the ground to move seed and fertilizer out through openings provided in the bottoms of the hoppers 16 and 18. The patent to Neff, 2,733,838, is a good example of a hopper employing a bottom rotor in this fashion and no further disclosure of the hoppers is considered necessary.

In FIGURES 3 and 4 the shaft 12 is shown as mounting a sprocket 19, and sprockets 20 and 21 are shown mounted on the extending rotor shafts 22 and 23, respectively, of the hoppers 18 and 16, a drive chain 24 being trained around the sprockets 19, 20, and 21, as shown. Apparatus for controlling the flow of the fertilizer and seed from the hoppers 18 and 16 is provided but will not be disclosed in detail in this application. The handles 25 and 26 control the apparatus for gauging the size of the openings in the bottom of hoppers 16 and 18. A rear roller 27, which is also formed of expanded metal, is journaled on a shaft 28 carried by the side frames 11 and aids in supporting the trailer vehicle 10. Fixed on the cross member 14 is a U-shaped guide member 29 (FIGS. 4 and 7) through which a vertical support member 30 extends. A clevis member 31 is fixed to the upper end of the support 30 and has openings 32 facilitating the attachment of a connecting link 33 (FIGURE 4) which is carried by the tractor T. The member 33 can be a channel member which fits over the clevis 31, as indicated in FIGURE 4, and includes an opening 34 through which a removable pin 35 can extend to releasably connect the tractor bar 33.

Figure 7:
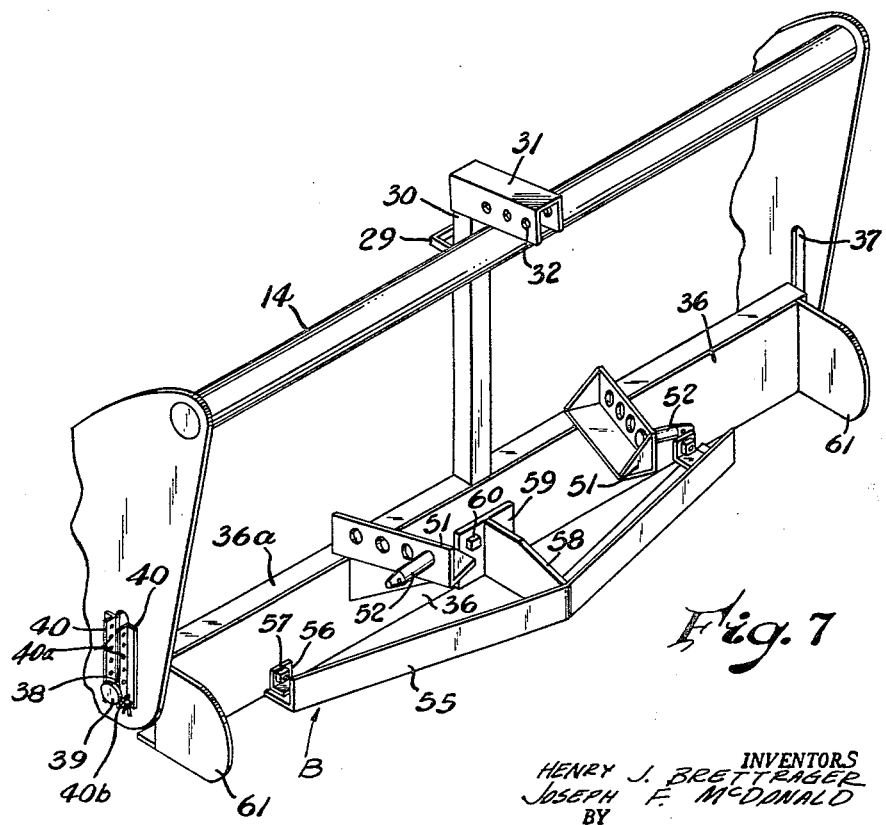
FIGURE 7 is a front perspective view of the ground leveling and filling members only.

Supported by the vertical member 30 is a backer blade 36 which, as FIGURES 3, 4 and 7 indicate, terminates short of the side plates 11 of the machine. Vertically slotted openings 37 are provided in the side plates 11 and rods 38 extend from a bar 36a fixed to the back of blade 36 freely through the vertically slotted openings 37 and guide therein, the rods 38 having enlarged heads 39 thereon which guide on spaced apart, vertically extending angle members 40 secured on the side plates 11 along the edges of the slots 37. The angles 40 have opening 40a through which a support pin 40b can extend to support the blade assembly. It is clear that with the blade 36 supported in this manner, the member 30 may be raised or lowered with the rods 38 traveling in the slots 37.

The tractor T may be a conventional Ford tractor such as the Ford three-point hitch tractor wherein bar 33 and bars 41 attach to the trailer 10. In this model tractor the bars 41 are raised or lowered as desired by a lift mechanism to vertically position the blade assembly.

In FIGURE 6 a possible alternative construction is shown in which a rear rail member 42 on the tractor and a similarly transversely disposed transverse member 43 comprise portions of the tractor frame. The arrangement to be described is only typical of a tractor construction which could be employed. The rear wheels of the tractor T which have tires 44 with relatively large lugs 44a and are mounted on rear axle 44b, as the tractor moves along, leave wheel tracks 45. (See the diagrammatic line showing in FIGURE 4.) In this construction channel bar member 33 may be pivoted to the frame cross bar 43 as at 46 and may be raised or lowered by a hydraulic cylinder 47 connected to the frame rear bar 42, as shown, to raise or lower the blade assembly B in the manner desired. The cylinder 47 can be a conventional, solenoid operated, double acting hydraulic cylinder which is pivoted as at 48 to the cross bar 42 and as at 49 to the bar 33. The draw bar members 41, which may be pivoted as at 50 to the tractor frame member 42 in the construction indicated in FIGURE 6, can be releasably secured to angle members 51 (FIGURES 4 and 7) welded to the blade 36, the angle members 51 having projecting pin members 52 adapted to extend through openings 53 provided in the draw bars 41 so that they can be secured by cotter pins 54. The double acting cylinder 47 could be electrically controlled from the front end of the tractor in the usual manner.

It is necessary that the ground surface upon which the fertilizer and seed are dropped be level in accordance with the surface it is desired that the lawn will have. The existence of wheel tracks left by a tractor which may be of a depth of three inches or of ridges along the sides of the path of an earth conditioning and seeding trailer is, of course, undesirable in a lawn. In FIGURE 5, where the ground lines are indicated in diagrammatic lines, it is seen that surplus soil at "b" for filling the tire tracks 45 is moved along by the bar 36 which leaves the surface at the desired height as at "a" so that the fertilizer and seed may be depoosited thereon. In order for the wheel tracks 45 to be properly filled so that no depressed tracks occur in the surface "a", a V-shaped angle bar 55 is employed in conjunction with the bar 36. It will be seen that the divergent bar 55, which is of considerably less height than blade 36 so that earth spills over it to blade 36, terminates at its ends at about the inner edge of the wheel tracks 45 and angle members 56 welded to the ends of the bar 55 are bolted to the bar 36 as at 57. A central brace member 58 welded to the bar 55 has flanges 59 which can be bolted to the bar 36 as at 60. Also welded to the bar 36 are forwardly extending, soil deflecting plate members 61 which travel in line with the outer edges of track 45 and operate to turn the soil inwardly. Otherwise ridges of surplus soil would form along the sides of the path of the trailer 10. Both the bar 55 and the members 61 operate to distribute the soil in such a manner that the tracks 45 are properly filled and, once the blade assembly including blade 36, bar 55, and members 61 has passed a smooth, uniform surface "a" remains on which the fertilizer and seed may be deposited.

In operation, the present earth conditioning and seeding trailer can easily install up to three acres, or 130,680 square feet of finished lawn, in an hour's time. It is contemplated that the machine will be used on ground which has been loosened and rough-graded. The blade or float 36 is set in advance at a particular height. However, where it is desired to change the height to obtain additional surplus soil, for instance, it is only necessary to actuate the bars 41 or hydraulic cylinder 47 (depending on the tractor construction) to change the level of blade 36 and members 55 and 61 during the operation of the machine.

The main roller 13, which drives the hopper shafts 22 and 23 and supports most of the weight of the trailer, does an excellent job of crushing the soil and obtains a good granulation thereof so that optimum conditions for complete germination of the seed are presented. The fertilizer hopper 18 is located in such position that fertilizer is released partly in front of the main roller, so it is worked down into the soil where it is available to the grass as the roots penetrate deeper, and partly to the rear thereof. Thence the seed hopper 16 drops grass seeed to the surface "a" and rake members R may be employed to cover the seed to the desired depth. The rear roller 27 balances the machine and helps the blade 36 to maintain an even, uniform grade. It also helps to cover the seed and leaves a cross-hatched finish that assists in preventing erosion. Further, it protects the seed from strong winds as it falls to the ground, so that the machine can be used even on days when there is a fairly strong wind.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:

1. An earth conditioning and seeding trailer having a fertilizer hopper, a seed hopper, and earth crushing roller means on which the trailer is supported, which is adapted to be drawn behind a tractor having spaced rear wheels; frame means supporting the fertilizer hopper and seed hopper, and journaling the supporting roller means; a vertically transversely disposed leveling blade means mounted on the front end of and substantially spanning said frame means with the lower surface thereof in operating position substantially at the level of the lower peripheral surface of said roller means; a forwardly convergent member joined to the leveling blade means in front of said blade means and comprising convergent portions which are low in height relative to said blade means so that earth spills over the said convergent member to said blade means, the lower surface of the convergent portions being substantially at the level of the lower surface of said blade means, and the ends of the convergent portions terminating short of spanning said blade means; adjusting means mounting said blade means and thereby said convergent member for vertical travel in a vertical plane from a raised position to a ground engaging leveling position; and forwardly extending side plates spaced transversely outwardly of said portions of the convergent member carried with said blade means.

2. The combination defined in claim 1 in which said side plates extend forwardly a distance near to the maximum forward extent of said convergent member.

3. The combination defined in claim 1 in which said frame means includes side plate members, and said adjusting means includes elongate, vertical slots in said side plate members and rods projecting transversely from said blade means received in said slots and movable vertically therein.

4. The combination defined in claim 3 in which fluid pressure operated means supports said rods in said slots.

References Cited in the file of this patent

UNITED STATES PATENTS

| 50,213 | Miuer | Sept. 26, 1865 |
| 1,227,926 | Parker | May 29, 1917 |
| 2,381,330 | Ariens | Aug. 7, 1945 |
| 2,537,802 | Thomas | Jan. 9, 1951 |
| 2,563,165 | Gandrud | Aug. 7, 1951 |
| 2,660,817 | Thomas | Dec. 1, 1953 |
| 2,730,054 | McDonald | Jan. 10, 1956 |
| 2,797,629 | Kelley | July 2, 1957 |
| 2,965,053 | Gruber | Dec. 20, 1960 |
| 2,983,060 | Rosselot | May 9, 1961 |
| 2,994,142 | Newell | Aug. 1, 1961 |

FOREIGN PATENTS

| 2,616 | Great Britain | May 5, 1802 |